US006721707B1

(12) United States Patent
Chu et al.

(10) Patent No.: US 6,721,707 B1
(45) Date of Patent: Apr. 13, 2004

(54) METHOD AND APPARATUS FOR CONTROLLING THE TRANSITION OF AN AUDIO CONVERTER BETWEEN TWO OPERATIVE MODES IN THE PRESENCE OF LINK IMPAIRMENTS IN A DATA COMMUNICATION CHANNEL

(75) Inventors: Chung Cheung C. Chu, Brossard (CA); Rafi Rabipour, Cote St-Luc (CA); David G. Sloan, Verdun (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/469,464

(22) Filed: Dec. 22, 1999

Related U.S. Application Data
(60) Provisional application No. 60/134,201, filed on May 14, 1999.

(51) Int. Cl.[7] .................. G10L 19/00; G10L 19/12; H04B 1/38
(52) U.S. Cl. .................. 704/500; 704/221; 455/560
(58) Field of Search .................. 704/239, 233, 704/228, 221, 500, 219, 214, 212; 455/560

(56) References Cited

U.S. PATENT DOCUMENTS

| 4,730,312 A | | 3/1988 | Johnson et al. |
| 5,768,308 A | | 6/1998 | Pon et al. |
| 5,774,847 A | | 6/1998 | Chu et al. |
| 5,956,673 A | * | 9/1999 | Weaver et al. ............ 455/436 |
| 6,009,383 A | * | 12/1999 | Mony .................. 455/418 |
| 6,034,994 A | * | 3/2000 | Yoon .................. 375/219 |
| 6,070,089 A | * | 5/2000 | Brophy et al. ............ 370/522 |
| 6,272,358 B1 | * | 8/2001 | Brent et al. ............ 370/352 |

* cited by examiner

Primary Examiner—Richemond Dorvil
Assistant Examiner—V. Paul Harper

(57) ABSTRACT

A signal processor for effecting the conversion of an audio data signal from one format to another. The signal processor has a signal converter that can selectively acquire two operative modes, namely a first operative mode and a second operative mode. In the first operative mode, the signal converter transforms the audio data signal from one format to another and releases the converted audio data signal from the output of the signal processor. In the second operative mode, the signal converter is disabled and permits passage of the audio data signal to the output without conversion. The signal processor has a control unit for controlling the transition of the signal converter between operative modes. The control unit enables the signal converter to pass from the first operative mode to the second operative mode when at least one operating condition has been satisfied. The control unit reacts to a link impairment occurring on the data communication channel to alter the operating condition to be satisfied to enable passage from the first operative mode to the second operative mode. In a specific example of implementation, the modification to the operating condition can be such as to "tighten" the requirements to be met for switching from the first to the second operative mode.

23 Claims, 4 Drawing Sheets

METHOD AND APPARATUS FOR CONTROLLING THE TRANSITION OF AN AUDIO CONVERTER BETWEEN TWO OPERATIVE MODES IN THE PRESENCE OF LINK IMPAIRMENTS IN A DATA COMMUNICATION CHANNEL

This application claims the priority benefit of U.S. Provisional Application No. 60/134,201, filed May 14, 1999.

FIELD OF THE INVENTION

This invention relates to signal processing and more particularly to a method and apparatus for enabling the transition of an audio data signal converter between the active mode and the inactive mode, when link impairments, either transitory or sustained, exist in the data communication channel. This invention finds applications in digital communication systems, such as a digital cellular system or a Voice-over-IP (VoIP) system, in particular vocoder bypass capable systems that can selectively enable the activation or de-activation of the decoding and encoding functions in the connection.

BACKGROUND OF THE INVENTION

In a digital communication system such as a wireless system or a VoIP system, an audio signal may be processed by a series of speech encoders and decoders as it is transmitted from one endpoint to another. In the example of a digital cellular mobile-to-mobile connection, the audio data signal is first encoded by a speech encoder at the first mobile telephone and transmitted in an encoded format to a base transceiver station of a cell site where it is transferred to the base station controller servicing that cell site. At the base station controller, the encoded speech information is processed by a compatible speech decoder that converts the compressed speech stream into PCM samples. The PCM samples are then transported over the landline network, such as the PSTN, toward the base station controller servicing the cell site communicating with the other mobile telephone. At the second base station controller, the PCM speech samples are again processed by a speech encoder. The encoded information is sent from the base transceiver station of the cell site to the second mobile telephone where the compressed speech stream is converted one more time by a speech decoder into PCM samples that can be used to generate an audio signal.

In this, codecs on both sides of the mobile-to-mobile call are connected in tandem, which is known to degrade the speech quality as a result of the successive encoding/decoding of the audio data signal.

The "vocoder bypass" technique alleviates this problem. During a connection between two base station controllers having identical codecs, the codecs are switched off when they are made aware of their mutual existence. Thus, the encoded speech information arriving at the first base station controller flows in encoded format through the PSTN and arrives as such at the second base station controller. Therefore, when in bypass mode, the data communication channel between the base station controllers transmits compressed data as opposed to speech samples. This procedure eliminates one decoding operation of the speech signal at the first base station controller and one re-encoding operation of the signal at the second base station controller. As a result, the audio quality is significantly improved.

For additional information on the "vocoder bypass" technique, the reader is invited to refer to the U.S. Pat. No. 5,768,308 granted to the present assignee that describes the process in great detail. The contents of this document are hereby incorporated by reference.

The codec in one base station controller can switch to the bypass mode as a result of an in-band hand-shaking operation with the codec in the other base station controller. Transmitting control information from one codec to the other over the audio data stream allows this hand-shaking operation to take place. The control information is transmitted by bit stealing. This is effected by inserting in selected PCM samples bits from the control information signal. Once the handshaking operation is completed, the decoder of the codec in one base station controller and the encoder of the codec in the other base station controller are caused to transition to the inactive mode.

An element of the bypass mode is the importance of ensuring the integrity of the data being transmitted between the two bypass capable devices. While the nature of a PCM speech sample is unlikely to be severely effected by possible bit manipulation that may arise during transmission over either the forward link or the return link of the data communication channel, a small change to the bits of a compressed audio data signal will have important detrimental consequences on the quality of communication over the link. Thus, codec bypass operations rely on a clear data communication channel between the two bypass capable devices. Channel noise or impairments present on the inter-device link may alter the traffic and/or signaling information bit pattern transferred between the two devices and could disrupt bypass operations causing severe degradation to the communication. Inter-device link impairments can be generated by poorly engineered connections, by jitter due to a packet network or by In-Path Equipment (IPE) such as A/D converters, D/A converters, echo cancellers, gain pads or conference bridges. Most of the IPEs alter the signal transferred on the link, completely prohibiting codec bypass operations before proceeding beyond the negotiation stage via PCM in-band signaling. Consequently, the communication remains in non-bypass mode with no noticeable degradation due to the impairment. However, some improperly conditioned connections, jitter or IPEs alter the signal lightly or selectively but could nonetheless induce severe degradation to the vocoder bypassed communication. Codec bypass operations under the influence of such noise and impairments may manage to proceed beyond the negotiation stage such that the communication enters the codec bypass mode. Bypass traffic information or signaling information will then be subject to important distortion by the impairments. In the case of traffic information distortion, end-to-end quality is poor for the duration of the codec-bypassed conversation. In the case of signaling information distortion, bypass stability is perturbed. Overall, the effect on the communication can be severely objectionable and annoying.

A particular problem also arises when the link impairment is of a magnitude such as to cause the bypass capable devices to exit the bypass mode momentarily. The existing bypass logic is such that the bypass capable devices will attempt immediately to re-engage the bypass mode. If they manage to do so under the same link impairment conditions, the bypass mode will be engaged and likely to be lost soon thereafter. This cycling is objectionable, as the quality of the transmission is highly degraded.

Against this background it clearly appears that there is a need in the industry to improve the behavior of signal processors, in particular bypass capable signal processors, in the case where link impairments develop in the data communication channel.

SUMMARY OF THE INVENTION

The present invention provides a signal processor for effecting the conversion of an audio data signal from one format to another. The signal processor has a signal converter that can selectively acquire two operative modes, namely a first operative mode and a second operative mode. In the first operative mode, the signal converter transforms the audio data signal from one format to another and releases the converted audio data signal from the output of the signal processor. In the second operative mode, the signal converter is disabled and permits passage of the audio data signal to the output without conversion.

The signal processor has a control unit for controlling the transition of the signal converter between operative modes. The control unit enables the signal converter from passing from the first operative mode to the second operative mode when at least one operating condition has been satisfied. In a specific, non-limiting example of implementation, the operating condition can be the reception from a companion signal processor of a certain number of error-free control messages during a handshaking operation. The present invention also covers the situation where a plurality of operating conditions need to be met to allow the transition from the first operative mode to the second operative mode.

The control unit reacts to a link impairment occurring on the data communication channel to alter an operating condition to be satisfied to enable passage from the first operative mode to the second operative mode. In a specific non-limiting example of implementation, the modification to the operating condition can be such as to "tighten" the requirements for switching from the first to the second operative modes. For instance, when the original operating condition is the reception of a number of error-free control messages during the handshaking operation, the altered operating condition requires a higher number of error-free control messages to be received to allow the signal converter to switch subsequently from the first operative mode to the second operative mode. This feature prevents or at least reduces the likelihood of undesirable cycling of the signal converter between its operative modes.

The signal processor according to the invention can find applications in digital communication systems, such as a digital cellular system or a Voice-over-IP (VoIP) system, in particular codec bypass capable systems that can selectively enable the activation or de-activation of the encoding and decoding functions in the connection. In a preferred embodiment, the audio data signal is an encoded signal that includes a succession of data frames. The signal converter has a codec with a decoder, located at a base station of the network that receives the audio data signal from the mobile telephone. In the active mode of the signal converter, the decoder converts the audio data signal into PCM format and sends it to a remote base station over a landline network, such as the PSTN (Public Switched Telephone Network). In the inactive mode, the signal converter passes the encoded audio data, namely the compressed data frames, to the output of the signal processor without decoding the data.

At the remote base station that receives the audio data signal from the first base station, the signal converter has a codec with an encoder. In the active mode of the signal converter, the encoder converts the audio data signal from PCM format to compressed format and sends the encoded data to the corresponding mobile telephone. In the inactive mode, the signal converter passes the encoded audio data received from the first base station to the corresponding mobile telephone without re-encoding the data.

The invention also provides a method for processing an audio data signal. During a first mode of operation, the audio data signal is converted from a first format to a second format, where in the first format the audio data signal is compressed data and in the second format the audio data signal is de-compressed data. During a second mode of operation, conversion of the audio data signal from a first format to a second format is omitted. The processing of the audio data signal can be switched from the first mode to the second mode when at least one operating condition is satisfied. The method comprises altering the condition when a link impairment develops, such that subsequent transition from the first to the second mode of operation will necessitate satisfying a different operating condition.

The invention also extends to a transmission system using the signal processor described above.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENT

Figure 1:
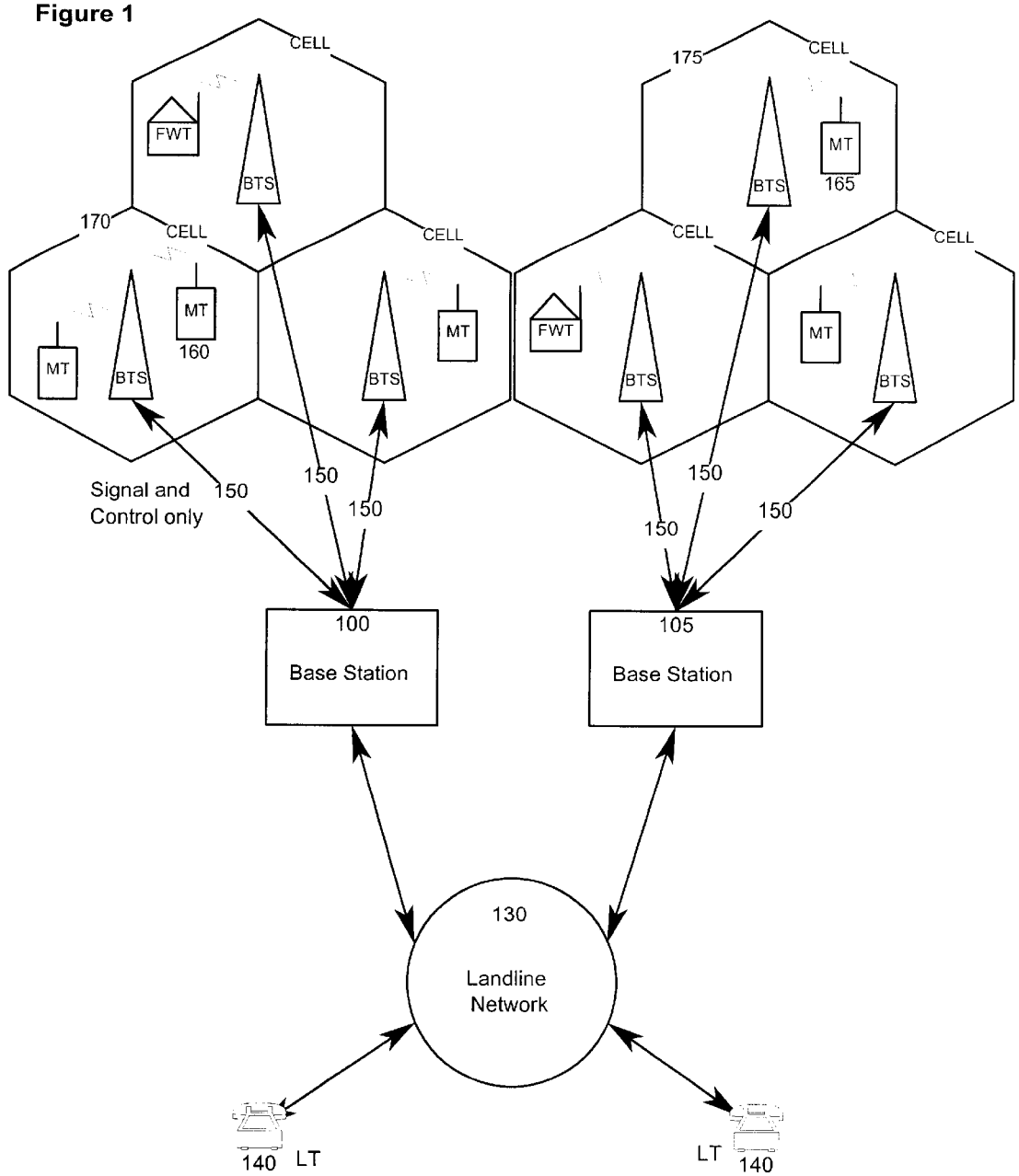
FIG. 1 is a block diagram illustrating a mobile-to-mobile digital cellular system connection through the PSTN.

FIG. 1 is a block diagram representation of a portion of a cellular wireless telecommunications network. In this figure, Mobile Terminals (MT) are on the move in the hexagonal areas defined as cells. Fixed wireless terminals (FWT) are also included in the areas defined as cells. Each cell covers a predetermined geographical area and has a Base Transceiver Station (BTS), which communicates through radio channels with the MTs and FWTs. A typical communication protocol between the BTSs and the MTs and FWTs may be a TDMA protocol. Alternatively, the communication protocol could be a CDMA or GSM protocol, among others. For purposes of illustration, assume hereinafter that a TDMA protocol is in effect. A number of these BTSs (i.e. cells) may be connected, for example by land line or microwave link 150, to one Base Station Controller 100, 105 (BSC), which controls handoff functions, among others, and routes the signal as requested. Each BSC 100, 105 is connected to a landline network 130. The landline network 130 may include, among others, the Public Switched Telephone Network (PSTN), the Integrated Services Digital Network and the Internet. Land terminals 140 (LT) connected to the landline network 130 are also shown for completeness.

In a specific call scenario, a first subscriber 160 is communicating with a second subscriber 165 via a first cell site 170 and BSC 100 and a second cell site 175 and BSC 105. The BSCs 100 and 105 communicate with each other over the landline network 130.

Figure 2:
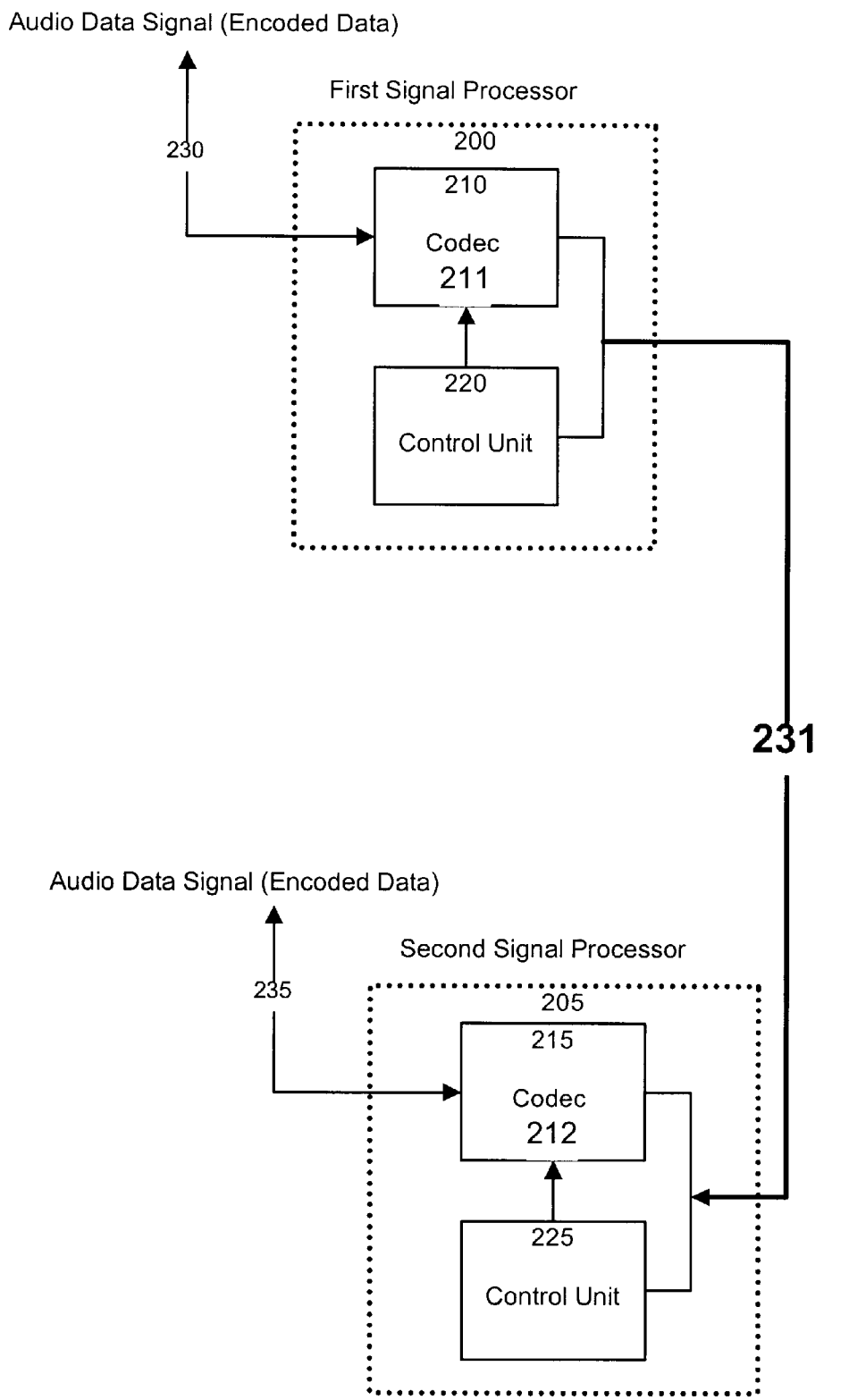
FIG. 2 is a block diagram illustrating the signal processors in two respective base station controllers of the digital cellular system of FIG. 1, that implement the novel signal processor in accordance with an embodiment of the present invention.

Each BSC 100, 105 comprises a digital signal processor. With reference to FIG. 2, the signal processor 200 is associated with the BSC 100, while the signal processor 205 is associated with the BSC 105. The digital signal processor 200 includes a codec 210 that provides the capability of voice transcoding from mu-law (or A-law PCM depending on which format is being used) to a compressed format (in accordance with the standard being used), and vice versa. The digital signal processor 205 includes a codec 215 that carries out same transformations. In a particular example, the compressed format in use is VSELP (Vector Sum Excited Linear Prediction).

The digital signal processors 200 and 205 are connected to one another by a transmission facility 231 that could be a data duplex communication channel through the landline network 130. For the purpose of this example, the transmission facility 231 includes a T1 connection. The data communication channel 231 includes a forward link for transporting signals from the first signal processor 200 to the second signal processor 205 and a return link for transporting signals from the second signal processor 205 to the first signal processor 200.

The digital signal processor 200 includes a control unit 220 that effects a handshaking procedure with the digital signal processor 205 to establish, if possible, a codec bypass condition. A control unit 225 is provided in the digital signal processor 205 to handle the handshaking function at the signal processor 205 side. In use, the control units 220 and 225 exchange control signals over the data communication channel 231. These control signals are multiplexed with the audio data stream transported over the data communication channel 231. Alternatively, the control signals may be sent separately over the data communication channel 231, in parallel with the audio data stream. When the handshaking operation for bypass operation in the direction from the BSC 100 to the BSC 105 is completed, control unit 220 issues a local signal at input 211 to codec 210, so that the decoding function is disabled. Similarly, control unit 225 issues its own local signal at input 212 to codec 215, so that the encoding function is disabled. For instance, encoded (compressed) audio data applied at the input 230 of the signal processor 200 is passed without being decoded through the transport facility 231. When the compressed audio data reaches the signal processor 205 it passes to the output 235 without being re-encoded and is directed to the mobile telephone 165 forming the end of the connection. This process will be described in greater detail later in this specification.

Digital signal processors are generally comprised of multiple signal processors commercially available from a number of suppliers. One such processor is Motorola's 560001 DSP.

When a TDMA mobile-to-mobile connection such as shown in FIG. 1 and in FIG. 2 is realized, two digital signal processors are involved in the connection. Normally, audio data signal that is audio information in an encoded format (such encoding has been effected at the mobile telephone 160) is introduced at an input 230 of the digital signal processor 200. Without any codec bypass procedure invoked, the audio data signal is passed to the decoder unit of the codec 210 and decoded into PCM format. Next, the PCM samples are transported to the digital signal processor 205 over the transport facility. The encoder unit of the codec 215 re-encodes the PCM samples that can then be sent to the mobile telephone 165.

This successive decoding/encoding operation introduces delay and perceptible coding noise that degrades the quality of voice signal. Note that such degradation of speech quality due to successive decoding/encoding operation may occur in a digital communication system other than a wireless system, for example a packet network implementing VoIP. Further, the present invention is applicable to network configurations in which a packet network may interconnect with another network type such as a circuit switched network or a wireless network.

In a typical interaction, the digital signal processor 200 sends to the digital signal processor 205 a control information signal that is essentially an identifier. As briefly discussed earlier, this handshaking function is handled by the control units 220 and 225. When the control unit 225 of the digital signal processor 205 receives this signal, it returns to the control unit 220 of the digital signal processor 200 an acknowledgement message. Upon reception of the acknowledgement message the control unit 220 of the digital signal processor 200 issues yet another control message to the control unit 225 and activates the bypass mode (i.e. inactive mode) by sending to the codec 210 a control signal at input 211 so that the decoder of codec 210 is de-activated. This means that the incoming stream of encoded frames from the mobile telephone 160 is passed as such in the transport facility 231. When the control unit 225 of the digital signal processor 205 receives the bypass control message from the control unit 220, the control unit 225 issues a local control signal that causes the encoder of codec 215 to acquire the bypass mode (i.e. inactive mode) such that the encoded audio frames are transmitted through the signal processor 205 without being re-encoded.

Figure 3:
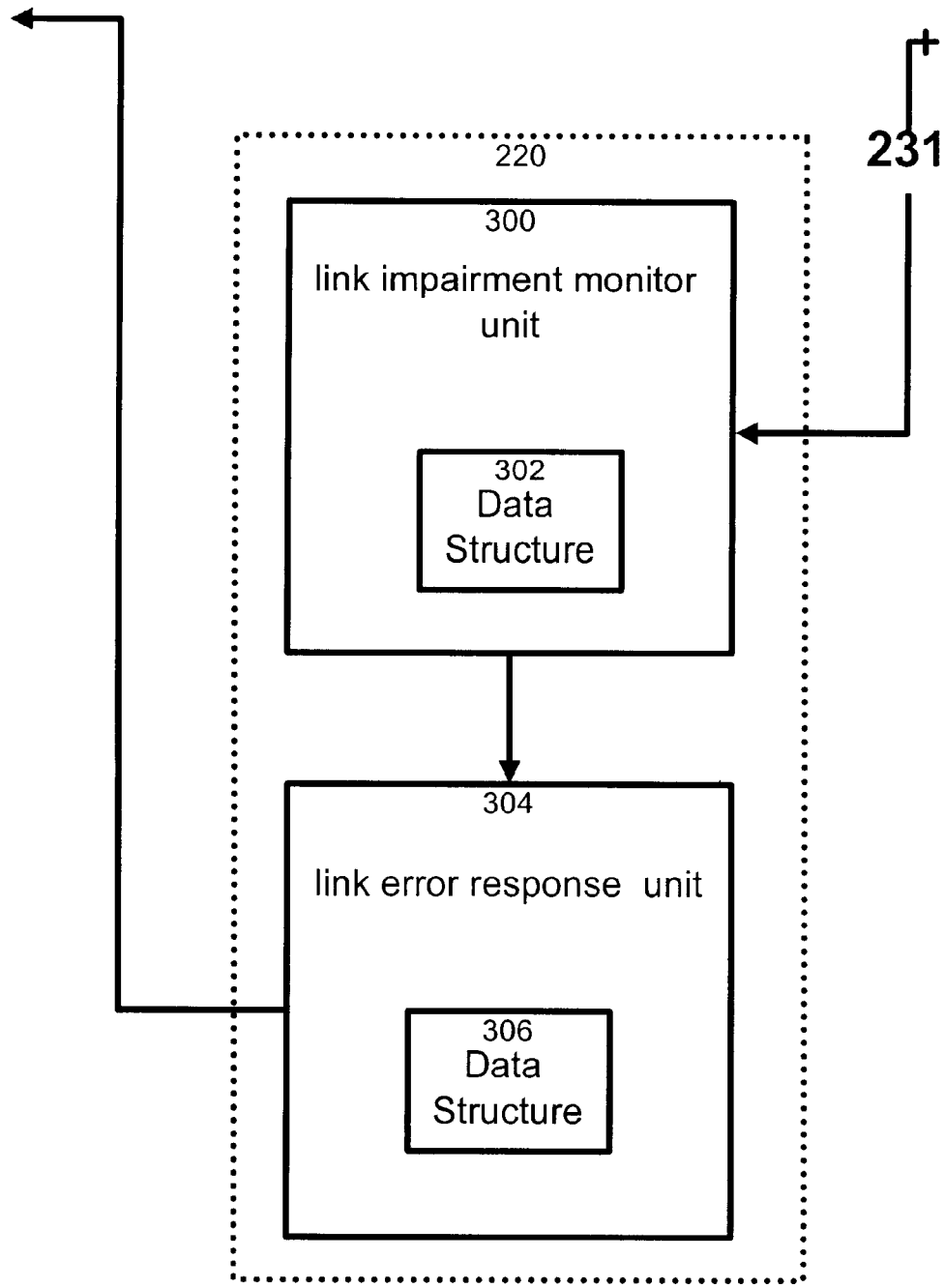
FIG. 3 is a block diagram of a control unit of a signal processor, in accordance with an embodiment of the present invention.

In order to more precisely control the transition to the bypass mode of each codec 210, 215 each control unit 220, 225 implements bypass logic that reacts to link impairments. A functional block diagram of the control unit 220 is depicted in FIG. 3. The control unit 225 has an identical functional behavior and for that reason the description of one control unit will apply to the other control unit.

The control unit 220 includes a link impairment monitor unit 300 whose basic function is to detect the occurrence of link impairments and also to collect statistical information about such impairments. The link impairment monitor unit is coupled to the data communication channel 231 and receives the audio data travelling on the return link of the data communication channel 231. That is to say that the control unit 220 of signal processor 200 effects link impairment analysis based on data issued by the companion signal processor 205. An alternative arrangement is also possible, where each signal processor will effect link impairment analysis on its own signals. This requires, however, that the signals originating from the signal processor be sampled at a point downstream the location where the link impairment occurs. This may be effected by providing a separate data transmission facility over which the signal samples can be transported.

The link impairment monitor unit 300 observes the audio data signal on the return link of the data communication channel 231 for the presence of data transmission errors that are indicative of the presence of a link impairment. In particular, assuming that the two signal processors 200 and 205 are in the bypass mode and exchange compressed audio data information, the link impairment monitor unit 300 will observe each frame of compressed audio data information and control information for possible corruption of the data that is protected by parity or by any other suitable error detection scheme. When errors are detected, a statistical analysis is performed and the results of this analysis are stored in a data structure 302. The following are examples of statistics that may be collected, among other possibilities:

Interval (remaining/staying in a particular bypass state);

Frequency of occurrence (of data transmission error);

Bit error rate (during negotiation and after bypass establishment);

Run-length (error pattern of continuous/bursty nature);

Energy level during negotiation (assuming bypass negotiation takes advantage/uses the energy profile).

The control unit 220 also comprises link error response unit 304 that is operative to react to the detection of a transmission error by the link impairment monitor unit 300, in dependence on the history of statistics maintained by the link impairment monitor unit 300 in the data structure 302. The link error response unit 304 also includes a data structure 306 that contains data elements representative of the operating condition(s) to be met to allow the signal processor 200 to switch to the bypass mode. The following is a non-limiting list of possible operating conditions:

Maximum number of bit errors during a certain time frame in the handshaking process;

A maximal time period allowed for completing a bypass handshaking procedure;

The minimal number of error-free control messages that must be exchanged during the handshaking procedure to consider the procedure successful;

Requiring a particular signal characteristic (such as energy level in the signal exchanged during the handshaking procedure).

The data structure 306 holds parameters related to the four operating conditions listed above. The logic enforced by the link error response unit 304 is such that the signal processor 200 will be allowed to enter the bypass mode only when the conditions defined by the various parameters in the data structure 306 have been met.

The link impairment monitor unit 300 is capable to transmit signals to the link error response unit 304. In particular two types of signals are transmitted to the link error response unit 304. The first signal is a notification signal to advise the link error response unit 304 that a data transmission error has been detected on the return link of the data communication channel. The second signal is the transmission to the link error response unit of the contents of the data structure 302 that will enable the link error response unit 304 to determine the type and characteristics of the link impairment causing the data transmission error(s) and react accordingly.

The link error response unit 304 has an output that generates the control signal applied at input 211 of codec 210 to enable the codec 210 to enter the bypass state. The signal applied to the input 211 also serves the opposite purpose that is to command the codec 210 to exit the bypass state.

Figure 4:
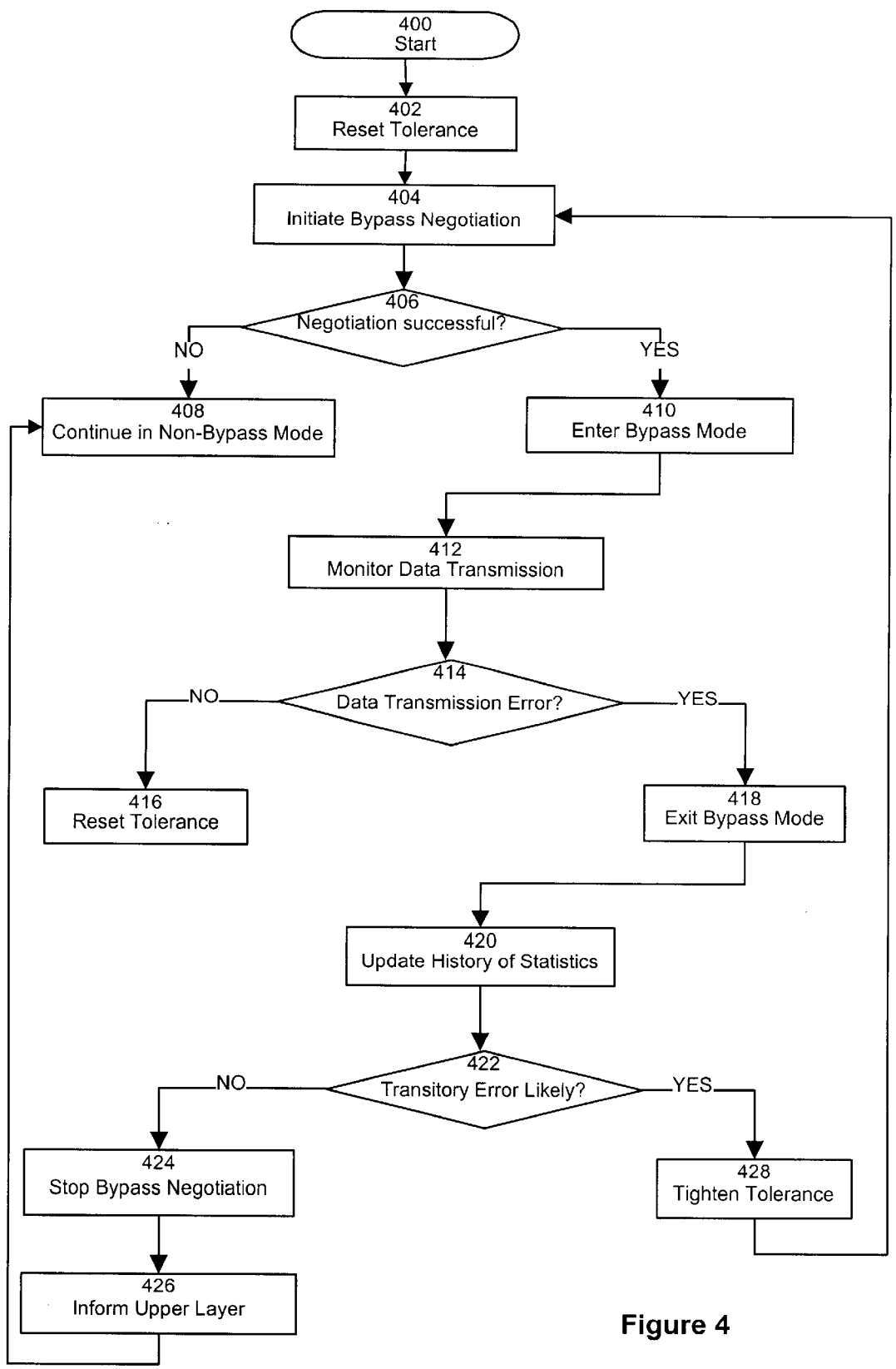
FIG. 4 is a flowchart illustrating an example of the operation of the signal processor in accordance with the invention.

FIG. 4 is a flowchart illustrating an example of the operation of the above described signal processor 200 and in particular the events that take place at the control unit 220 for detecting and reacting to impairments over a duplex communication channel inter-connecting the two signal processors 200 and 205. At step 402, the tolerance levels are reset. At step 404, negotiation between the two signal processors 200 and 205 is initiated in order to enter the bypass mode. In this particular example, the link error response unit 304 applies two operating conditions that must be met before allowing the codec 210 to switch to the bypass mode. The first operating condition establishes a maximal amount of time to complete a successful bypass negotiation. The second operating condition is the minimal number of error-free control messages that must be received by the control unit 220 from the signal processor 205 to consider the negotiation successful. The parameters as to the maximal amount of time to complete a successful bypass negotiation and the minimal number of error-free control messages are read from the data structure 306. The link error response unit 304 basically establishes a timer mechanism to test the first operating condition and a counter mechanism to test the second operating condition. The timer mechanism and the counter mechanism are reset on a call establishment action such as a call setup or a handoff. A flag will be set at the link error response unit 304 if full duplex bypass mode of operations is not reached in a pre-defined time-out period, i.e. the flag is set if the timer expires before the signal processor 200 receives and transmits bypass compressed information. The flag is set even if a half duplex bypass mode of operations or intermittent half duplex bypass mode of operations is negotiated within the timeout period, resulting in the transmission or reception of bypass frames in only one of the forward or return directions. The flag is also set if the number of bypass/non-bypass transitions within a certain period of time exceeds a certain threshold. The link error response unit 304 will discontinue the bypass negotiation at step 408, effectively disabling the bypass feature for the remaining duration of the conversation, where this may include the provision to re-attempt bypass negotiation at a much later time. On the establishment of the next call, the bypass mode feature is enabled and the timer, the counter, the flag and any related parameters are all reset.

If the negotiation is successful, the signal processors 200 and 205 both enter the bypass mode at step 410, such that compressed data is transmitted over the data communication channel 231 between the signal processors 200 and 205. At step 412, the link impairment monitor unit 300 monitors bypass frames for the presence of impairments over the link, where such impairments will have manipulated the bypass frame bits such that the compressed (encoded) data and/or the control information is corrupted. Upon detection of a data transmission error at step 414, the link impairment monitor unit 300 issues a signal to the link error response unit 304. The link error response unit 304 will issue a control signal to the codec 210 to cause the encoder of the codec 210 to exit from the bypass mode. At step 420, the history of statistics maintained by the link impairment monitor unit 300 is updated and recorded in the data structure 302.

The link impairment monitor unit 300 then sends another signal to the link error response unit 304 to communicate to the link error response unit 304 the updated statistics. The link error response unit uses the history of statistics to determine whether the data transmission error detected by the link impairment monitor unit 300 is transitory (i.e. not permanent) or sustained.

At step 422, the link error response unit analyses the statistics issued by the link impairment monitor unit 300 and determines whether the detected transmission error is likely to be transitory (i.e. whether it is likely to disappear) or sustained (i.e. whether it is likely to reoccur), by analyzing the history of statistics. The statistics are studied to determine whether they reveal a particular pattern, where this pattern may be:

a low number of detected transmission errors, with respect to a particular predetermined threshold;

having been in a bypass state successfully for a predetermined duration;

a negotiation interval that is below a certain predetermined threshold;

having never stayed in the bypass state for a sufficient length of time, with respect to a predetermined threshold;

a particular frequency of re-occurrence of this statistic analysis;

a high bit error rate.

In a specific example, a statistic pattern representative of a sustained transmission error is one that reveals that the system has toggled between bypass mode and non-bypass mode greater than 10 times within a 1-second period of time. In another example, a statistic pattern representative of a transitory transmission error is one that reveals that the system has toggled between bypass mode and non-bypass mode twice within a 1-second period of time, and since the last toggle has remained in bypass mode for 2 seconds.

If the link error response unit determines that the error is likely to be transitory at step 422 (for example in the case of call waiting), the parameters of the operating condition(s) stored in the data structure 306 are altered such as to tighten the level of tolerance for such transmission errors at step 428. This tightening of the tolerance may include decreasing the maximal time interval to reach successful negotiation and/or increasing the number of error-free control messages to be received to complete the negotiation. Other operational characteristics that could also be altered are as follows:

the imposed maximal number of bit errors during the negotiation;

a required particular signal characteristic (such as energy level).

Once the tolerance has been tightened at step 428, bypass mode negotiation is attempted again (i.e. re-initiated) at step 404.

If the link error response unit 304 determines that the error is likely to be sustained at step 422, bypass negotiation is stopped at step 424, where this may include the provision to re-attempt bypass negotiation at a much later time. In other words, the interval between successive negotiation attempts is determined. At step 426, the upper layer (i.e. the system layer) is informed of the sustained transmission error, as well as of the resulting exit from bypass mode and interrupt of bypass negotiation. The system layer will react accordingly to such information, as it is operative to detect and recognize status messages arriving from lower layers within the telecommunications network. In particular, the system layer implements a multitude of different functionalities, each one initiated in response to notification of a particular event occurrence at a lower layer within the telecommunications network. In a specific example, the system layer is responsive to receipt of a sustained transmission error message from a base station controller to switch to use a different communication channel and/or to notify system operators of the communication channel defects, among many other possibilities.

Note that if the link impairment monitor 300 does not detect a data transmission error at step 414, such that the communication continues in bypass mode for a period of time exceeding a pre-determined threshold, the tolerance levels are reset at step 416.

The control unit 220 can be implemented in various ways. One possibility is to use software executed on a suitable computing platform that includes a Central Processing Unit (CPU), a memory connected to the CPU through a bus and suitable interfaces. The program element that implements the functionality of the control unit 220 is stored in the memory where the individual instructions of the program are executed by the CPU. An alternative approach is to use multiple digital signal processors, such as the Motorola's 560001 DSP.

The above description of a preferred embodiment should not be interpreted in any limiting manner since variations and refinements can be made without departing from the spirit of the invention. The scope of the invention is defined in the appended claims and their equivalents.

We claim:

1. A signal processor, comprising:

an input for receiving an audio data signal;

an output for connection to a data communication channel;

a signal converter coupled to said input for processing the audio data signal at said input, said signal converter capable to selectively acquire a first operative mode and a second operative mode, in said first operative mode said signal converter converting the audio data signal from a first format to a second format and releasing the audio data signal in said second format from said output, in said second operative mode said signal converter permitting passage of the audio data signal to said output without conversion to said second format;

a control unit coupled to said signal converter, said control unit being operative to enable said signal converter to pass from said first operative mode to said second operative mode when at least one operating condition has been satisfied, said control unit being responsive to the detection of a link impairment on the data communication channel to alter the at least one operating condition that must be satisfied in order to enable passage from said first operative mode to said second operative mode.

2. A signal processor as defined in claim 1, wherein said signal processor is operative for establishing a bi-directional communication with a remote entity over a duplex communication channel including a forward link and a return link, said output being operative for coupling to the forward link for transmitting the audio data signal toward the remote entity on the forward link, said signal processor being operative for receiving an audio data signal from the remote entity on the return link, said control unit being responsive to the detection of a link impairment occurring on the return link of the data communication channel to alter the at least one operating condition that must be satisfied in order to enable passage from said first operative mode to said second operative-mode.

3. A signal processor as defined in claim 2, wherein the audio data signal is conveying speech sound information.

4. A signal processor as defined in claim 3, wherein the first format is a compressed version of the audio data signal in the second format.

5. A signal processor as defined in claim 4, wherein said signal converter includes a decoder.

6. A signal processor as defined in claim 5, wherein said decoder is a VSELP decoder.

7. A signal processor as defined in claim 4, wherein said control unit includes a link impairment monitor for monitoring audio data signal in the first format on the return link of the data communication channel for the presence of impairments over the return link.

8. A signal processor as defined in claim 7, wherein said control unit includes a link impairment response unit coupled to said link impairment monitor for receiving from said link impairment monitor a data signal conveying link impairment information.

9. A signal processor as defined in claim 8, wherein said link impairment response unit includes a data structure holding data elements representative of operating conditions to be satisfied to enable passage from said first operative mode to said second operative mode, said link impairment response unit being operative to alter at least one of the data elements representative of the operating conditions to be satisfied to enable passage from said first operative mode to said second operative mode in response to reception from said link impairment monitor of a data signal indicative of occurrence of a link impairment.

10. A signal processor as defined in claim 9, wherein at least one of the data elements representative of the operating conditions to be satisfied to enable passage from said first operative mode to said second operative mode is altered such as to tighten a tolerance level with respect to the occurrence of a link impairment on the return link of the data communication channel.

11. A signal processor as defined in claim 10, wherein said link impairment monitor is operative to detect a link impairment on the return link of the data communication channel by detecting data transmission errors on the return link of the data communication channel.

12. A signal processor as defined in claim 11, wherein said link impairment monitor is operative to detect data transmission errors on the return link of the data communication channel by observing parity information contained in the audio data signal in the first format on the return link of the data communication channel.

13. A signal processor as defined in claim 12, wherein said link impairment monitor includes a statistical analysis unit for generating data indicative of information selected in the group consisting of time during which said control unit has stayed in said second operative mode, frequency of occurrence of data transmission errors on the return link of the data communication channel, bit error rate during negotiation for passage from said first operative state to said second operative state, bit error rate while in said second operative state, run-length, energy level during negotiation for passage from said first operative state to said second operative state.

14. A signal processor as defined in claim 13, wherein the data signal conveying link impairment information conveys at least in part to said link impairment response unit the data generated by said statistical analysis unit.

15. A signal processor as defined in claim 14, wherein said control unit when in said second operative mode is responsive to the detection of a link impairment occurring on the data communication channel to switch to said first operative mode.

16. A signal processor as defined in claim 15, wherein an operating condition to be satisfied to enable passage from said first operative mode to said second operative mode corresponds to a maximal time interval within which to complete successful negotiation for passage from said first operative state to said second operative state.

17. A signal processor as defined in claim 16, wherein said operating condition may be altered such as to tighten a tolerance level with respect to the occurrence of a link impairment on the return link of the data communication channel by decreasing the maximal time interval within which successful negotiation for passage from said first operative state to said second operative state must be completed.

18. A signal processor, comprising:
input means for receiving an audio data signal;
output means for connection to a data communication channel;
signal converter means coupled to said input for processing the audio data signal at said input means, said signal converter means capable to selectively acquire a first operative mode and a second operative mode, in said first operative mode said signal converter means converting the audio data signal from a first format to a second format and releasing the audio data signal in said second format from said output means, in said second operative mode said signal converter means permitting passage of the audio data signal to said output means without conversion to said second format;
control means coupled to said signal converter means, said control means being operative to enable said signal converter means to pass from said first operative mode to said second operative mode when at least one operating condition has been satisfied, said control means being responsive to the detection of a link impairment on the data communication channel to alter the at least one operating condition that must be satisfied to enable passage from said first operative mode to said second operative mode.

19. A method for processing an audio data signal, said method comprising:
providing an input for receiving the audio data signal;
providing an output for connection to a data communication channel;
providing a signal converter coupled to said input for processing the audio data signal at said input, said signal converter capable to selectively acquire a first operative mode and a second operative mode, in said first operative mode said signal converter converting the audio data signal from a first format to a second format and releasing the audio data signal in said second format from said output, in said second operative mode said signal converter permitting passage of the audio data signal to said output without conversion to said second format;
providing a control unit coupled to said signal converter, said control unit being operative to enable said signal converter to pass from said first operative mode to said second operative mode when at least one operating condition has been satisfied;
in response to detection of a link impairment on the data communication channel, altering the at least one operating condition that must be satisfied to enable passage from said first operative mode to said second operative mode.

20. A method as defined in claim 19, wherein said signal processor is operative for establishing a bi-directional communication with a remote entity over a duplex communication channel including a forward link and a return link, said output being operative for coupling to the forward link for transmitting the audio data signal toward the remote entity on the forward link, said method comprising:
receiving an audio data signal from the remote entity on the return link;
in response to the detection of a link impairment occurring on the return link of the data communication channel, altering the at least one operating condition that must be satisfied to enable passage from said first operative mode to said second operative mode.

21. A method as defined in claim 20, wherein the audio data signal is conveying speech sound information.

22. A transmission system, comprising:
a first signal processor;
a second signal processor; and
a duplex data communication linking said first signal processor to said second signal processor, said duplex data communication channel including a forward link and a return link;

said first signal processor being operable to convert an audio data signal from a first signal format to a second signal format for transmission on said forward link to said second signal processor, said second signal processor being operable to reconvert said audio data signal from said second signal format to said first signal format;

said first signal processor including:
 a) an input for receiving the audio data signal;
 b) an output coupled to said forward link for transmitting the audio data signal in either one of the first and second format to said second signal processor;
 c) a control unit operative to enable said signal processor to pass the audio data signal without conversion to the second signal format to said output, when at least one operating condition has been satisfied, said control unit being responsive to the detection of a link impairment on said duplex data communication channel to alter the at least one operating condition that must be satisfied in order to enable said signal processor to pass the audio data signal without conversion to the second signal format.

23. A signal processor, comprising:

an input for receiving an audio data signal;

an output for connection to a data communication channel;

a signal converter coupled to said input for processing the audio data signal at said input, said signal converter capable to selectively acquire a first operative mode and a second operative mode, in said first operative mode said signal converter converting the audio data signal from a first format to a second format and releasing the audio data signal in said second format from said output, in said second operative mode said signal converter permitting passage of the audio data signal to said output without conversion to said second format;

a control unit coupled to said signal converter, said control unit being operative to enable said signal converter to pass from said first operative mode to said second operative mode when at least one operating condition has been satisfied, said control unit including:
 a link impairment monitor for monitoring the audio data signal in the first format on the return link of the data communication channel for the presence of impairments over the return link;
 said control unit being responsive to the detection by said link impairment monitor of a link impairment occurring on the data communication channel to alter the operating condition that must be satisfied in order to enable passage from said first operative mode to said second operative mode.

* * * * *